United States Patent
Chen et al.

[11] Patent Number: 5,876,342
[45] Date of Patent: Mar. 2, 1999

[54] SYSTEM AND METHOD FOR 3-D ULTRASOUND IMAGING AND MOTION ESTIMATION

[75] Inventors: Jian-Feng Chen, Issaquah; Lee Weng, Bellevue, both of Wash.

[73] Assignee: Siemens Medical Systems, Inc., Iselin, N.J.

[21] Appl. No.: 884,708

[22] Filed: Jun. 30, 1997

[51] Int. Cl.[6] ............................................. A61B 8/00
[52] U.S. Cl. ............................................. 600/443; 128/916
[58] Field of Search ..................................... 600/437, 443, 600/444, 447; 73/597; 128/916; 382/128, 278, 285

[56] References Cited

U.S. PATENT DOCUMENTS

| | | |
|---|---|---|
| 5,396,890 | 3/1995 | Weng . |
| 5,474,073 | 12/1995 | Schwartz et al. . |
| 5,575,286 | 11/1996 | Weng et al. ............................ 600/444 |
| 5,582,173 | 12/1996 | Li ........................................... 600/443 |
| 5,594,807 | 1/1997 | Liu . |
| 5,655,535 | 8/1997 | Friemel et al. ....................... 600/443 |

OTHER PUBLICATIONS

B.K.P. Horn, Hugh M. Hilden & Shahriar Negahdaripour, "Closed–form solution of absolute orientation using orthonormal matrices," 1988 Journal of the Optical Society of America.

*Primary Examiner*—George Manuel

[57] ABSTRACT

A system and method for 3-D ultrasound image registration and 3-D motion estimation. A calibrated 3-D speckle function is first pre-determined for the transducer and the tissue to be scanned. A series of image frames are identified and grouped into 3-D big and small blocks. Blocks representing speckle are identified and then, a full width half maximum value sum-absolute-difference technique is used to obtain an out-of-plane motion estimation based on decorrelation characteristics throughout the volume. For in-plane motion estimation, cross-correlation characteristics between pairs of frames are compared and, using a minimum sum absolute value technique, an estimate of in-plane motion is obtained. Fuzzy logic techniques are then used to obtain more accurate estimates. Finally, the out-of-plane motion estimate is updated based on decorrelation characteristics of the speckle frames used for the in-plane determination using a full width half maximum value technique.

24 Claims, 7 Drawing Sheets

SYSTEM AND METHOD FOR 3-D ULTRASOUND IMAGING AND MOTION ESTIMATION

BACKGROUND OF THE INVENTION

1. Field of the Invention

This invention involves a system and a method for generating three-dimensional (3-D) images of structures from two-dimensional (2-D) images obtained through scanning, in particular, from 2-D images scanned using ultrasound.

2. Description of the Related Art

Imaging of a portion of a patient's body for medical diagnostic purposes is known. In the context of medical ultrasonic imaging, signals are sensed most strongly from portions of the region where the local change in acoustic impedance is greatest. The relative strengths of the return signals are then converted and processed and displayed in some form, for example, on a monitor, that represents an image of the scanned region.

Existing imaging systems using, for example, ultrasound and positron-based technologies such as Positron Emission Tomography (PET) and Single Positron Emission Computerized Tomography (SPECT), generate images of the body that represent scan planes, that is, 2-D "slices" of the scanned region. These systems display each slice as it is generated so that the user "sees" the 2-D image corresponding to the current position and orientation of the transducer.

A drawback of such purely 2-D imaging is that most of the imaged structures appear only as cross sections: the user gets no clear image of structures that do not extend in the plane of the "slice" currently being displayed. For example, if an artery is perpendicular to the scan plane, then all the user will be able to see is a small, circular region. Even sharp bends in the artery will not be apparent.

One approach to solving this problem is to simply compile a large number of 2-D image frames, register them in some way, and then display images in any plane of the registered compilation. However, in order to make proper registration possible, accurate information about the distance between adjacent frames must be known. Such information often is not available, since the user normally does not move the transducer at a constant speed, even assuming the user moves it in a constant direction. The user may, for example, spend more time "looking" at a particularly interesting portion of the scanned region and move quickly past other portions. Furthermore, different users will normally not move the transducer at the same speed.

One known way of dealing with this problem is to mount the transducer in a motorized bracket arrangement and then move it at a constant speed using motors. However, this is expensive and bulky; requires a separate procedure for 3-D scanning than is used for 2-D scanning; and eliminates much of the user's ability to directly control the scan, especially when using the hand-held transducers commonly used in ultrasonic imaging.

Another way to solve this problem is to mount mechanical (for example, wheels), inertial (accelerometers), magnetic (for example, Polhemus devices) or other types of position sensors on the transducer itself, to obtain distance information along with the scan information. The drawback of this solution, however, is that such sensors add weight and complexity to the transducers, which makes it difficult to provide them in low-cost machines. Moreover, metallic objects in the examination area can create noise that disturbs magnetic position sensors, and almost every object between the sensor and the transducer will interfere with line-of-sight infrared or ultrasound sensors.

Another known way of creating 3-D images is to use multiple transducers that simultaneously image the same regions from two or more perspectives. The "stereo" imaging data is then processed using known algorithms into a 3-D data set. This solution, however, has an obvious disadvantage: multiple transducers lead to increased costs and complexity. Another method is to use the distribution of a series of successive scatterers in the scanned region and certain correlation techniques to construct a 3-D model of blood flow. This method presupposes, however, that the scanned region is a flowing medium with a given velocity distribution.

Finally, local motion for a 3-D ultrasound image may be determined based on the correlation of B mode images using the mathematical auto-correlation and cross-correlation functions. However, such methods are computationally intensive and frequently are limited to off-line studies.

Accordingly, there is a need for a system and associated method for generating 3-D images using a single transducer. There is a further need for three-dimensional imaging with little or no change to the flexible and familiar user-directed scan procedures, even for hand-held transducers. There is a still further need for a creating 3-D representations even of non-moving tissue. Finally, there is a need for a 3-D ultrasound system which may be accomplished in real time.

SUMMARY OF THE INVENTION

These problems are overcome in large part by a system and method according to the present invention. An in-plane motion signal and an out-of-plane motion signal are derived from successive 2-D images, based on matching certain speckle qualities therebetween. From the in-plane motion signal and the out-of-plane motion signal, distances between the 2-D images may be obtained, and then used to derive a global motion signal and used to construct a 3-D image.

According to one embodiment, a calibrated speckle function is predetermined for the transducer and the tissue region to be scanned. A series of image frames are identified and grouped into 3-D big and small blocks. Blocks representing speckle are identified and then a decorrelation characteristic over the blocks is obtained. The block decorrelation characteristic is employed to obtain an out-of-plane motion estimate. In addition, a cross-correlation characteristic between pairs of frames is used to obtain an in-plane motion characteristic. A decorrelation characteristic based on the pairs of frames may also be used, in conjunction with the volume decorrelation characteristic, to obtain a more accurate out-of-plane motion estimate.

According to one embodiment of the invention, a calibrated speckle function is first pre-determined for the transducer and the tissue to be scanned. A series of image frames are identified and grouped into 3-D big and small blocks. Blocks representing speckle are identified and then, a full width half maximum value sum-absolute-difference optimization technique comparing blocks is used to obtain an out-of-plane motion estimation based on a decorrelation characteristic throughout the volume. For in-plane motion estimation, a minimum sum absolute difference technique is used to obtain an estimate of in-plane motion using a cross-correlation characteristic between pairs of frames. Fuzzy logic techniques are then used to obtain more accurate estimates. Finally, the out-of-plane motion estimate is updated based on a decorrelation characteristic (using a FWHM SAD optimization) of the speckle frames used for the in-plane determination. Once local motion estimates are made based on the small blocks, a global motion estimation may be obtained using a least mean square technique.

BRIEF DESCRIPTION OF THE DRAWINGS

A better understanding of the present invention is obtained when the following detailed description is considered in conjunction with the following drawings in which.

DETAILED DESCRIPTION OF THE INVENTION

As is well known, when an object is scanned by some form of radiation, structures within the object that are too small to be resolved (roughly: smaller than the wavelength of the scanning radiation) may disperse, reflect, or otherwise interfere with the signal that is returned to the scanning device. When the device then creates an image based on the returned scan signal, this interference, which is noise, often makes the image less clear. For example, in medical ultrasonic imaging, an ultrasonic beam transmitted into the body is scattered by the microstructure of the tissue. This interference is known as "speckle."

Speckle causes the image to appear granular, which in turn obscures smaller structures and masks the presence of low-contrast lesions. The problem is analogous to "snow" on a television screen, which reduces the "sharpness" of the TV image. The problem of speckle also appears—albeit usually to a lesser extent—in other imaging technologies such as Positron Emission Tomography (PET) and Single Positron Emission Computerized Tomography (SPECT).

According to the present invention, speckle information is used to derive distance information about the distance that separates the several scanned planes of a 3-D interrogation volume. The invention may be used to generate 3-D images from 2-D scanned images obtained using any technology that encounters "speckle." The invention is described below in the context of medical ultrasonic imaging.

More particularly, distances between 2-D B mode images are derived via a local in-plane motion estimate and a local out-of-plane motion estimate, based on speckle properties of portions of each 2-D frame or image. The local in-plane estimate and the local out-of-plane estimate are then used to obtain a global motion estimate. According to one embodiment, speckle regions in each frame are identified. Then, a best match based on certain properties of speckle (for example, decorrelation properties) over a predetermined number of 2-D frames defining a block volume is used to obtain the out-of-plane estimate. Then a best match of properties (for example, cross-correlation properties) of speckle between pairs of frames are used to obtain an in-plane motion estimate. Additionally, a best match of decorrelation properties between the same images used for the in-plane estimate is used in conjunction with the volume decorrelation characteristic to obtain a more accurate estimate of the out-of-plane local motion. Quality factors may be defined and fuzzy logic techniques may be employed to further optimize the local motion estimates. Once the local in-plane and out-of-plane estimates are determined, global motion between frames may be determined. From this, the distances between the 2-D frames are used to build a 3-D representation.

In one embodiment, a full width half maximum (FWHM) sum-absolute-difference (SAD) optimization technique is employed to derive the out-of-plane estimates based on decorrelation characteristics. Similarly, a minimum sum-absolute-difference (MSAD) optimization technique is employed to derive the in-plane motion estimates based on cross-correlation characteristics.

A primary advantage of the FWHM SAD and MSAD optimization methods for determining the best match between blocks or frames is that they do not require any multiplication—only additions/subtractions for computation of the SAD similarity of two blocks and then only comparisons in order to find the minimum and full width half maximum values on the SAD maps. Another advantage is that relatively few memory positions are required for storage of the intermediate values during the calculations. As such, the FWHM SAD and MSAD methods are fast and efficient. On the other hand, the SAD routine may not always be the best at rejecting the influence of certain types of noise, and it does not use any (or much) beforehand knowledge of the known or assumed features of structure, noise or, in the case of ultrasound imaging of the body, speckle.

Other optimization methods may therefore be used instead depending on the particular imaging environment and on whether the processor used for calculations is fast enough and there is sufficient memory. For example, a least squares optimization technique may be used, in which the minimum of the sum of the squares of the different pixel pairs in blocks is instead sought and, once found, assumed to be the best match. The least squares method requires multiplications as well as additions/subtractions, but can be shown to provide a statistically optimal match for certain types of noise.

Furthermore, statistically-based matching techniques such as mathematical decorrelation and cross-correlation may be used to determine in-plane and out-of-plane motion. Thus, they may be used to provide a measure of the best match between frames or blocks.

Figure 1:
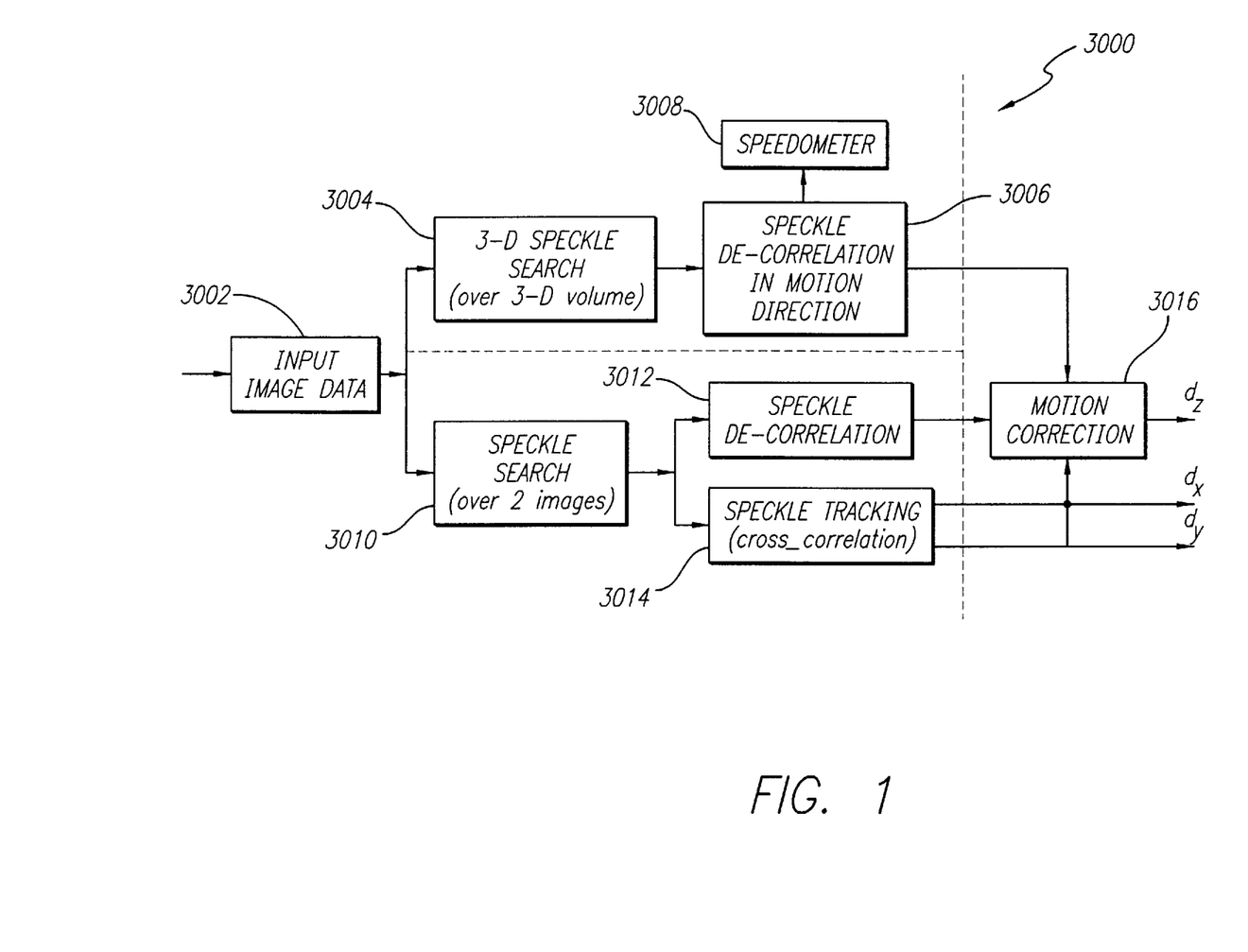
FIG. 1 is a diagram illustrating a system according to an embodiment of the invention.

Turning now to FIG. 1, a flow diagram illustrating components of an exemplary system 3000 according to the present invention is shown. Initially, image input data 3002, such as 2-D B-mode images are obtained, typically by running a transducer over a region of interest, as will be described in greater detail below. The image input data are then used to determine both in-plane and out-of-plane motion, as will be described in greater detail below.

Figure 2:
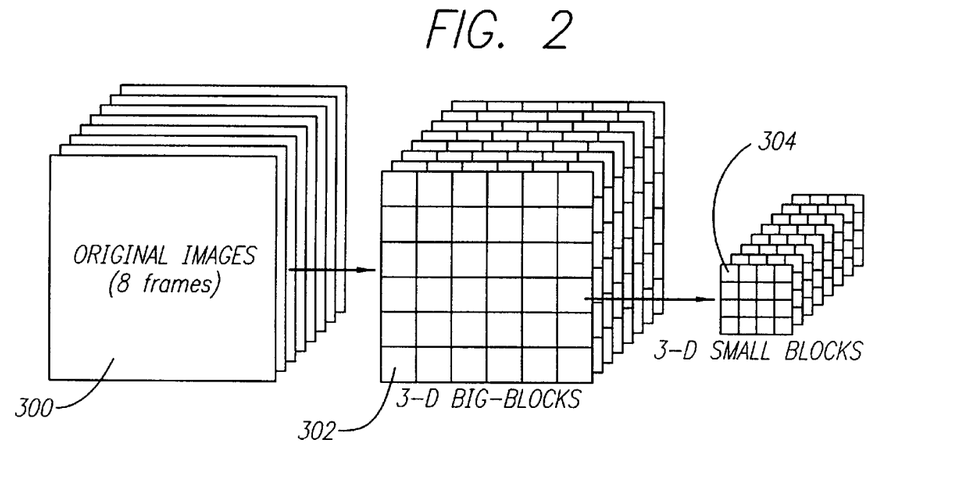
FIG. 2 is a diagram illustrating 3-D big and small blocks according to an embodiment of the present invention.

FIG. 2 illustrates an exemplary set of eight (8) images or frames 300. The frames represent image data stored in memory which, as needed, may be down-sampled. The images 300 are divided into several rows and columns of 3-D big blocks 302 for purposes of the local motion estimation. The big blocks are of large enough size to include enough statistical information to estimate local motion, because the statistical uncertainty of that estimation will be increased for a small sized block. However, the 3-D big blocks cannot be too large, because fewer big blocks can cause the global motion estimate to be unstable. In addition, a large big block can introduce image rotation error into the local motion estimate, which assume that the 3-D big blocks have no rotational motion.

Each big block 302 is then divided into small blocks 304, for the speckle search. Again, there are trade-offs as to small block size. The small blocks must be large enough to contain enough statistical information so as to evaluate whether they contain speckle or non-speckle information, but must be small enough so that the statistical information within each small block is the same (i.e., that each small block is all speckle or all non-speckle).

Turning back to FIG. 1 and, more particularly, to the upper branch, in stage 3004, a 3-D speckle search is conducted to identify those blocks which include speckle data. Any of a variety of known methods may be used to identify the speckle regions; one exemplary embodiment, using a mean/histogram technique, is described below. Once the speckle search has been conducted, a speckle decorrelation characteristic, for example, based on a FWHM SAD value, is determined over the 3-D blocks in order to determine a distance value in the out-of-plane direction. The out-of-plane motion value is then compared in a speedometer 3008 to check for accuracy, as will be described in greater detail below. In addition, the out-of-plane estimate is outputted to a motion correction unit 3016, whose purpose will be described in greater detail below. Finally, an estimate $d_z$ for out-of-plane local motion for each small block is output.

Turning back to the lower branch, in order to determine the x and y components of in-plane motion for each small block, a speckle search 3010 is conducted over a predetermined region of interest. The speckle search 3010 is similar to that conducted for the upper branch but here, the search is only over two images. Once the speckle search 3010 has identified the speckle regions, a speckle decorrelation characteristic 3012, for example, based on a FWHM SAD value, is obtained to obtain out-of-plane information, in a manner similar to that described above. The two-image speckle decorrelation information is then provided to the motion correction unit 3016, in order to obtain a more accurate estimate of the out-of-plane motion. Finally, the speckle search information is provided to a speckle tracking unit 3018 which identifies a cross-correlation characteristic, for example, based on a MSAD technique, on the speckle data to obtain $d_x$ and $d_y$, the components of in-plane local motion. Once the in-plane and out-of-plane local motion estimates have been determined, optimization may be performed, and a global motion estimate is obtained. Once the global motion estimate is obtained, the distances between frames are used to build the 3-D image.

Figure 3:
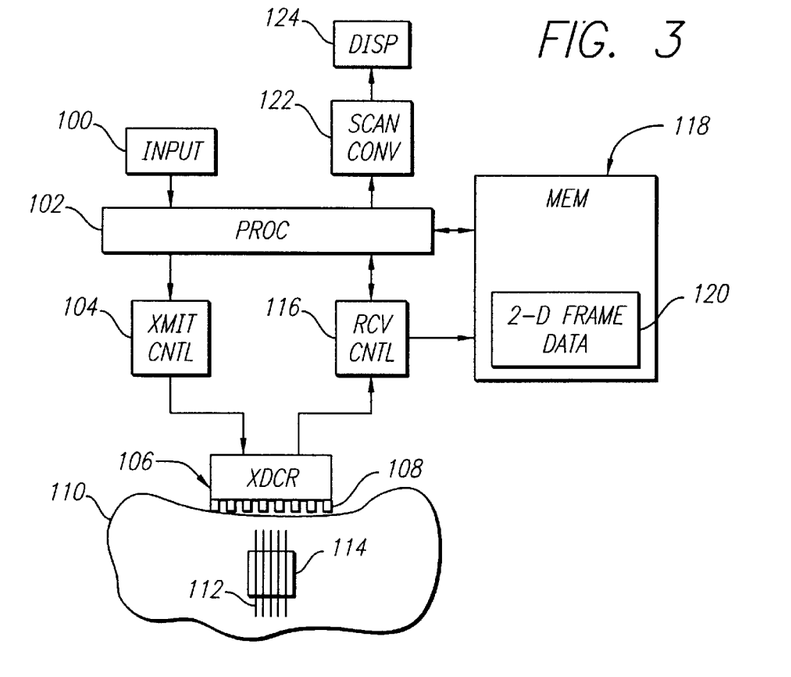
FIG. 3 is a block diagram that illustrates the main structural components of an ultrasonic imaging system according to the invention.

FIG. 3 illustrates the main components of an ultrasonic imaging system according to the invention. The user enters the various conventional scan parameters into an input unit 100, which typically includes such devices as a keyboard, knobs, and buttons. The input unit is connected to a processing system 102, which will typically be an electrically connected and cooperating group of processors such as microprocessors and digital signal processors; the processing system may, however, also be implemented by a single processor as long as it is fast enough to handle the various tasks described below.

As in known systems, the processing system 102 sets, adjusts, and monitors the operating parameters of a conventional transmission control circuit 104, which generates and applies electrical control and driving signals to an ultrasonic probe 106, which includes an array 108 of piezoelectric elements. As is well known in the art, the piezoelectric elements generate ultrasonic waves when electrical signals of the proper frequency are applied to them.

By placing the probe 106 against the body of a patient, these ultrasonic waves enter a portion 110 of the patient's body. By varying the phasing, amplitude, and timing of the driving signals, the ultrasonic waves are focused to form a series of scan lines 112 that typically fan out from the probe. Several such scan lines are shown extending into the patient's body in FIG. 3. A region of interest, that is, the region that the user wants to have an image of, is shown as an interrogation region or volume 114. The manner in which ultrasonic scanning signals are controlled, generated, and applied to a patient's body is well understood in the art and is therefore not described further. The interrogation volume 114 may be scanned using a series of substantially adjacent scan planes (each comprising several scan lines) that extend over a known depth.

Figure 13A:
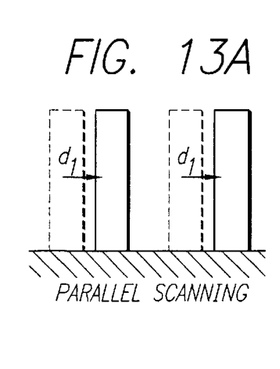
FIG. 13A–13C are diagrams illustrating types of scanning according to an embodiment of the present invention.
Figure 13B:
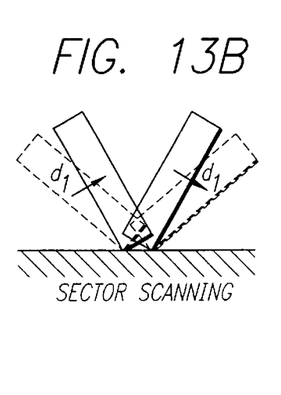
Figure 13C:
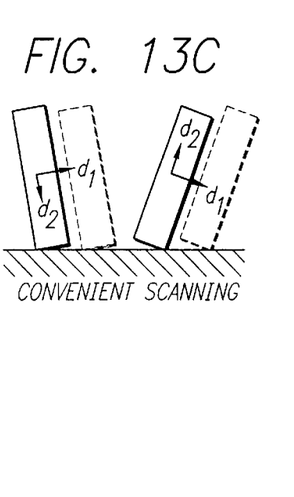

In one embodiment, the degrees of freedom of transducer motion are constrained so that the image's positions are more accurately estimated. As shown in FIGS. 13A–13C, in such an embodiment, three types of scanning are used: parallel scanning, sector scanning, and convenient scanning. For both parallel and sector scanning, there is only one degree of freedom (either parallel or rotation based on the out-of-plane motion estimation factor $d_1$). For convenient scanning, two degrees of freedom need to be determined, for example on related to the in-plane motion and the other related to the out-of-plane motion. It is noted, however, that the present invention is not limited to the three types of scanning shown in FIG. 13. Thus, FIG. 13 is exemplary only.

Turning back to FIG. 3, ultrasonic echoes from the waves transmitted into the body return to the array 108. As is well understood, the piezoelectric elements in the array thereby convert the small mechanical vibrations of the echoes into corresponding electrical signals. Amplification and other conventional signal conditioning is then applied to the return signals by a reception controller 116. This processing includes, as needed, such known signal conditioning as time-gating, gain compensation, and diffraction compensation, in order to identify the echo signals that correspond to each scan plane of the interrogation volume 114.

The reception controller 116, all or part of which is normally integrated into the processing system 102, converts the ultrasonic, radio-frequency (RF) return signals (typically on the order of a few to tens of megahertz) into lower frequency ranges for processing, and may also include analog-to-digital conversion circuitry. This is well known in the art of ultrasonic imaging. The down-converted power values for the two-dimensional interrogation region are stored in a memory 118 as 2-D frame data 120, after conventional beamforming. Each set of frame data corresponds to one image frame, that is, to a 2-D cross section of the interrogation volume. Each frame of the image is represented and stored digitally as an array of acoustic power or intensity values for the image elements that make up the frame. As is explained in greater detail below, a series of 2-D frames—each corresponding to one image "slice"—is stored in the memory.

The interrogation region is normally not in the same shape as what the user wants to see displayed, and even when it is, the digital acoustic intensity values formed into beams are normally not in a form suitable for driving a conventional gray-tone or color display directly. The acoustic intensity values for an image frame are therefore applied to a conventional scan converter 122, which converts the digital acoustic values into display intensity or brightness values that are suitable for driving a display device 124. The display 124 is typically divided into a pattern of picture elements or "pixels" that make up an image that the user can view and interpret. Scan conversion and display are well-known features of an ultrasonic imaging system and are therefore not described further.

Figure 4:
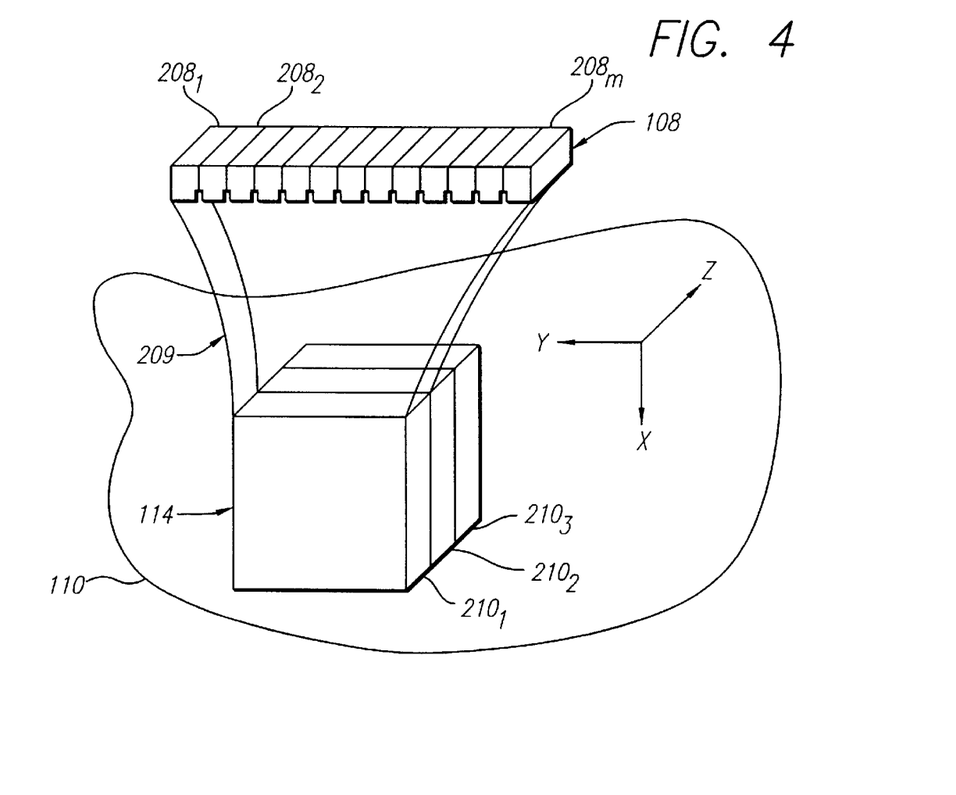
FIG. 4 illustrates the manner in which a piezoelectric array scans an interrogation region as a series of image frames.

FIG. 4 shows an orthogonal depth-lateral-elevation (X-Y-Z) coordinate system and illustrates the way in which an ultrasound transducer scans the interrogation region 114. When the elements $208_1, 208_2, \ldots, 208_m$ are arrayed in the lateral (Y) direction, they generate (with proper, conventional focusing) ultrasonic waves that form a transmit beam 209 in order to image portions of the body in the depth-lateral (X-Y) plane. Each portion is converted in the conventional manner into a corresponding image frame. In FIG. 4, three frames $210_1, 210_2, 210_3$ are shown that are adjacent in the elevation (Z) direction. FIG. 4 is greatly simplified for the sake of clarity: in actual scans, there will be many more than three adjacent frames and the frames need not be square. Moreover, the invention is also able to accommodate non-parallel frame planes, for example, such as would be generated when scanning by rotating or moving the transducer in an arc rather than just in the Z direction.

As is well known, each frame of an ultrasonic image is commonly resolved by the reception controller 116 or processing system into a 2-D pattern of image elements, each of which is represented and stored in the memory as a corresponding power value. In the simplest and most common case, images are generated, stored, and displayed using digital values corresponding to gray tones only. (The invention may also be used with color representations.)

Speckle in the images is normally defined in terms of known statistical properties, and there are several known methods for identifying, and, in many cases, reducing speckle and of identifying what is assumed to be non-speckle, homogeneous tissue regions. Some methods, for example, identify as speckle any image element whose value differs by more than a predefined functional value of the average and standard deviation of the values of the elements in a region surrounding the element. According to the invention, any known method may be used to identify homogeneous tissue regions and image elements that are speckle within those regions.

The invention determines motion between frames based on matching speckle properties. Once 2-D image frames have been scanned in and stored, any of several known methods may be used to determine which portions of the frames correspond to speckle regions. In order to obtain the most accurate estimate of the relationship between speckle match and distance, only speckle regions should ideally be compared; deviation from this ideal will not destroy the usefulness of the invention, but it will in most cases reduce the fidelity of the 3-D representation of the interrogation volume.

In one embodiment, a mean/histogram technique is employed to identify the speckle pixels. More particularly, turning now to FIG. 5, a diagram illustrating a 20×20-pixel portion of a scan image as it might be displayed on a two-dimensional display. The approximate scan area of an actual ultrasonic scan generated by typical existing devices with conventional resolution is 1.3 mm$^2$ ; the invention is not limited to any particular maximum number of pixels, and the minimum number of pixels necessary to use the invention will become clear below. Each pixel is shown as being square for the sake of clarity only; in many displays, for example, pixels are made up of one or more dots. The invention is not limited to any particular pixel shape, although, in order to maintain convenient indexing, it is computationally advantageous if the pixels are evenly or at least regularly distributed according to some set of coordinate axes.

Each pixel has a gray-scale brightness that may vary from pure white (100% luminance) to pure black (0% luminance). The number of different gray tones that a pixel may have is determined by the size of the memory data word that holds the numerical brightness parameter for that pixel. For example, assume that the memory 118 (FIG. 1) stores the brightness value for each pixel as an 8-bit data word. It would then be possible to represent $2^8=256$ different levels of grayness, with, for example "255", corresponding to maximum displayable brightness and "0" corresponding to maximum displayable darkness. The value "128" would in this case correspond roughly to "medium gray".

Figure 5:
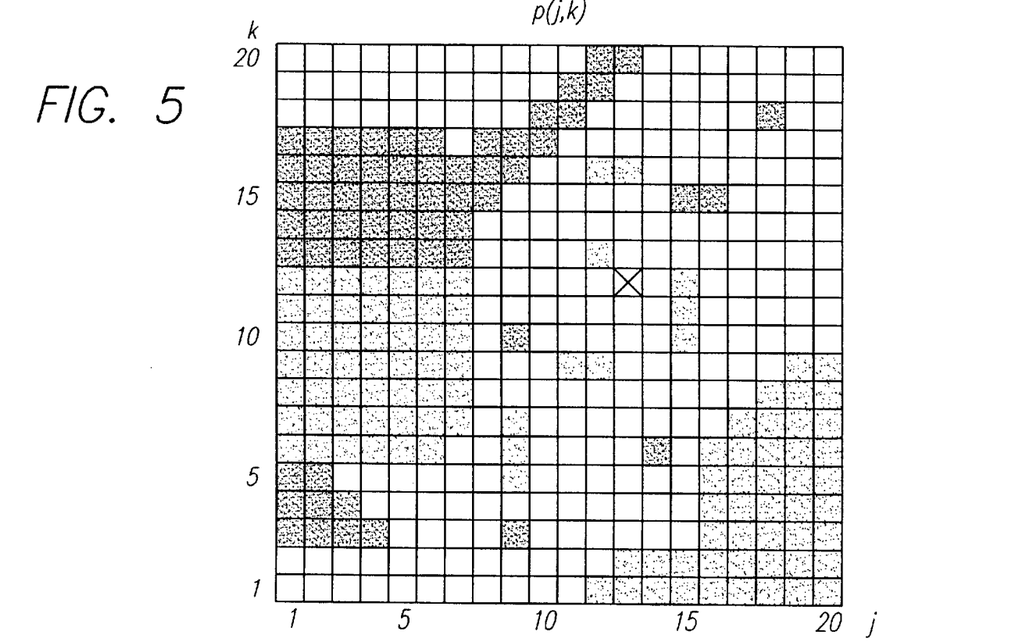
FIG. 5 is a diagram of a portion of a scan image according to an embodiment of the present invention.

In FIG. 5, the horizontal index is labelled "j" and the vertical index is labelled "k": both indices range from 1 to 20. The brightness value of the pixel located at horizontal position j and vertical position k is p(j,k). The phrase "pixel p(j,k)" is to be understood as "the pixel at position j,k" or "the brightness value of the pixel at position j,k"; the correct interpretation will be obvious from context. For example, pixel p(1,15) in FIG. 5 is darker than pixel p(10,17).

According to an embodiment of the invention, one of the pixels in a "speckle region" of the displayed imaged is selected as a reference pixel, according to known methods. In FIG. 5, the reference pixel $P_{ref}$ is p(13,12), and has been marked with an "x" for clarity. Once a reference pixel has been chosen, a reference window is selected around the reference pixel. The reference window is a group of adjacent pixels that includes the reference pixel. The size of the reference window may either be predetermined and fixed, or it may be chosen automatically or manually for each image or sequence of images. The reference window should include enough pixels that the brightness histogram is statistically meaningful: the window should be large enough that it includes some speckle, but ideally not so large that it includes regions of the image that indicate structure. The best window size for any given application will depend on the resolution of the image. The lower the resolution, the larger the window may have to be for it to be statistically meaningful. Window size will also depend on the achievable computation speed (depending on the speed of the processor, real-time image processing may not be possible if the window is chosen to be too large), and can be determined by calculation and experiment. These concepts and criteria are made clearer below.

In the context of medical ultrasonic imaging, in order to have reliable speckle statistics, the window should be big enough to cover a region with a high density of scatterers. A window size of 7×7 is assumed in this explanation by way of illustration. Any m×n window may be used. Depending on the area of application and imaging technology, there may be no reason to assume information is direction-dependent. In these cases, the window is square and in order for the reference window to be centered about the reference pixel, the number of pixels on each side of the window is preferably odd. If, however, imaging information is direction-dependent (non-isotropic), then non-square windows may be chosen.

Once a reference window has been chosen, a reference histogram is compiled for the reference window, which indicates how many pixels in the reference window have brightness values in predetermined intervals. There will typically be many more possible brightness values for a given pixel than there will be pixels in a chosen window. For example, if each pixel is represented as an 8-bit data word and the window is 7×7, then the 49 pixels in the window could theoretically each have any of 256 different levels of grayness. If the number of pixels for each individual brightness value were to be accumulated, then at least 256−49= 207 (and probably many more) of the entries would be "empty" (zero pixels with the corresponding brightness values) and the histogram itself would in most cases be almost flat everywhere else.

In one implementation of the invention, there is no need to actually display a histogram; actual graphically illustrated histograms are shown in the drawings for the sake of clarity only. In this description of the invention, "histogram" is to be understood as meaning the accumulation into a number of memory positions of the number of pixels whose brightness (or other) values fall in the range assigned to the corresponding memory position. "Bins" of histograms are thus the memory positions. Histograms will normally be vectors (linked series of memory positions) whose elements are the "bins." The reference histogram may be displayed, however, on the display in a test or calibration mode to give the user an indication of the general properties of the current image.

In order to accumulate a histogram with a shape that provides statistically significant information (discussed below) about the reference window, the possible pixel brightness values are therefore grouped into intervals or "bins". The number of bins chosen represents a trade-off between noise tolerance and sensitivity. The number used determines the smoothness of the histogram and can be determined by calculation and experiment for any given application, but in general the number of bins may be from about one-fifth to about one-half the number of pixels in a window. Furthermore, it is computationally advantageous if the number of bins is a power of two since the number of bins will then usually divide evenly into the number of possible pixel brightness values, which will also typically be a power of two. For example, if the number of brightness groups or "bins" is 16, in which each bin represents an interval of 256/16=16 brightness values, pixels are tallied in bins as follows:

| Pixel Values | Bin |
|---|---|
| 0–15 | 0 |
| 16–31 | 1 |
| 32–47 | 2 |
| 48–63 | 3 |
| 64–79 | 4 |
| 80–95 | 5 |
| 96–111 | 6 |
| 112–127 | 7 |
| 128–143 | 8 |
| 144–159 | 9 |
| 160–175 | 10 |
| 176–191 | 11 |
| 192–207 | 12 |
| 208–223 | 13 |
| 224–239 | 14 |
| 240–255 | 15 |

Figure 6:
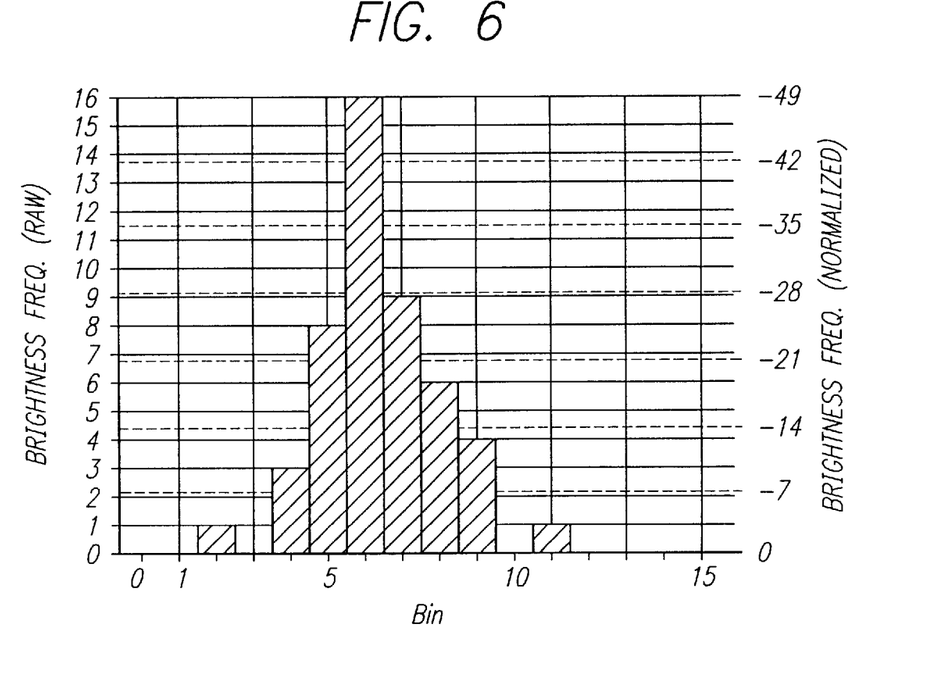
FIG. 6 is a graph of an exemplary reference histogram for identifying speckle according to an embodiment of the invention.

This is, of course, only one example of the many acceptable choices of how pixel brightness values can be grouped and ordered. FIG. 6 illustrates a hypothetical reference histogram based on a 7×7 reference window. In this example, 16 of the 49 pixels had brightness values in the range of Bin 6, nine lay within the range of Bin 5, and so on.

In order to establish a uniform scale for comparison of different histograms, each value of the reference histogram (and later, each current histogram) may be normalized so that the value of the "peak" is equal to the number of pixels in a window, in this case, 49. In FIG. 6, the most frequent brightness values fall in Bin 6—sixteen pixels in the window had brightness values within the corresponding range. The peak bin is therefore number 6, which has a value $B_{peak}=16$. The values of all bins are therefore normalized by multiplying by 49/16. The normalized brightness scale is shown to the right in FIG. 6.

In actual implementations, for each pixel window, a number of memory positions will be allocated in the memory unit equal to at least the number of bins. The processor then increments each bin for each pixel in the current window whose brightness falls within the range of that bin. When all the pixels in the window have been tallied in their respective bins, the bins will hold numbers corresponding to the histogram. The processor then determines the peak of the histogram by stepping through the bins and recording the address of the bin with the highest number. This number is then used to normalize all bin entries.

From the test histogram and the reference histogram, a quality factor may be defined:

$$QF(i) = \frac{1}{N} \sum_{j=1}^{N} \exp((-\beta)\|x_{i,j} - y_j\|)$$

$$0 \leq QF(i) \leq 1$$

where N is the total number of bins for the reference histogram, $x_{i,j}$ is the test histogram for the ith small block and $y_j$ is the reference histogram, j is a bin's index, and β is an adjustable parameter. In one embodiment, β may be calculated as shown below:

$$\beta = \frac{q\ln 10}{20r^2 D_{max}^2}$$

where $-q$ dB (width)=$rD_{max}$, $0<r<1$, and where $D_{max}$ is the maximum possible absolute error between the values of a bin of the current histogram and a bin of the reference histogram. It is noted, however, that this representation of $\beta$ is exemplary only. Any empirically chosen positive value can be used. Further details regarding derivation of the quality factor may be obtained form U.S. Pat. No. 5,594,807, which is hereby incorporated by reference in its entirety.

The more the current histogram resembles the reference histogram, the more likely it is that the current window also represents a speckle window. If the quality factor is within a predetermined value, it will be assumed that the small block refers to a speckle region.

For each individual small block identified above as a speckle volume, a decorrelation characteristic over the volume between frames of the volume is determined and an estimate of in-plane motion is determined. In one embodiment, a Full Width Half Maximum Sum-Absolute-Difference technique is employed to determine the best match between volumes, though other mathematical techniques may be used. In particular, the values of Sum-Absolute-Difference as a function of step number $b_{m,k}$, are calculated using:

$$b_{m,k} = \sum_l \sum_i \sum_j \|I_{i,j}^l - I_{i,j}^{l+k}\|$$

Here, m is a small block's index, k is the step number, which is from 1 to 7, $1_{i,j}^l$ is the gray level of the lth B-mode image at a specific point (i,j), and l is an image index. For example, if k=1, then the steps will compare the first and second images, the second and third images, and third and fourth images, and so on. If k=2, then images 1 and 3, 2 and 4, 3 and 5, and so on, will be compared.

Finally, the SAD values for each big block, $B_k$, are determined based on the summation of the SAD values over all the speckle regions within that big block weighted by the quality factors QF(i):

$$B_k = \frac{\sum_{i=1}^{M} QF(i) b_{i,k}}{\sum_{i=1}^{M} QF(i)}$$

where i is a small block's index, and k is a step number and M is the total number of small blocks.

Figure 7:
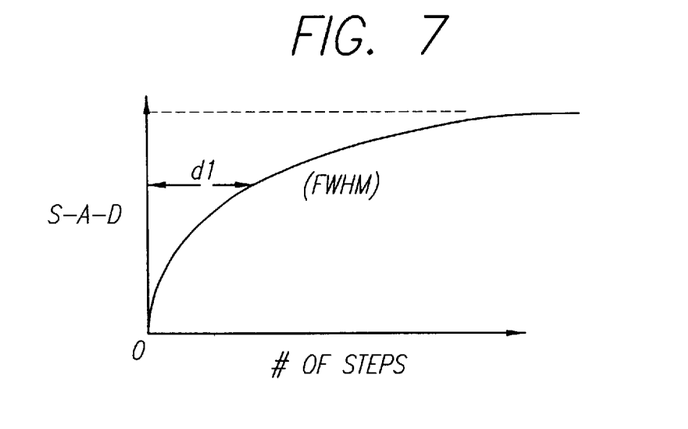
FIG. 7 is a diagram showing a full width half maximum sum-absolute-difference curve according to an embodiment of the present invention.

Having obtained a SAD curve representing a decorrelation characteristic between the blocks at various steps, a "best match" occurs between blocks and succeeding frames at the full width half maximum value (FWHM) of the SAD curve, $d_1$, as shown in FIG. 7. The value $d_1$ is representative of the decorrelation rate. If there exists a high decorrelation, then the value of $d_1$ will be small, and the frames are farther apart; if there is a high decorrelation, then $d_1$ will be larger, and the frames closer together. The actual distance between frames at a particular step size may be obtained as below:

$$x_{distance} = \frac{d_{ref} R_{step}}{d_1}$$

where $X_{distance}$ is the distance of out-of-plane motion, $d_{ref}$ is a reference value obtained using standard reference phantoms, and $R_{step}$ is the step size corresponding to the reference value. In general, the distance of out-of-plane motion is a function of image location, but is independent of image location if there is a parallel translation, with no rotation.

The SAD technique is used to derive a first estimation of a local motion vector $d_1(i)$ having a direction and magnitude indicating how the block translated. Under the influence of image noise, tissue motion and other image artifacts, the first SAD motion estimation is not always very reliable. Accordingly, two measures of the quality and reliability of the first local motion vector estimation $d_1(i)$ are devised, termed $S_1(i)$ and $S_2(i)$. The measure $S_1(i)$ is given by:

$$S_1(j) = \frac{\sum_{j=1}^{M} QF(j)}{M}$$

where M is the number of small blocks in each big block and QF(j) is the speckle quality factor for each small block j. Thus, $S_1(i)$ is representative of the shape of the speckle region; a larger $S_1(i)$ means a more reliable speckle region and a better $d_1(i)$ estimate.

The score $S_2(i)$ is given by:

$$S_2(i) = \frac{d_1(i) - d1_b}{d1h}$$

where $d1_h$ is the FWHM value of the SAD curve for the previous measurement of the same position. Thus, the quality factor $S_2(i)$ represents how much the local motion estimate $d_1(i)$ deviates from its past. If one value of $d_1(i)$ has a very different direction and magnitude as compared with its history, it is very likely that this estimation is under the influence of noise or local tissue motion and does not accurately reflect true image local motion. In this case the $d_1(i)$ estimation is not very reliable. Thus, a large value of $S_2(i)$ indicates that the estimated $d_1(i)$ is less reliable.

While the above estimation quality control concept is easy to understand, in practice it is difficult to implement since image changes caused by transducer motion can be rather complex. Accordingly, the quality and reliability of the motion estimate can be efficiently quantized by use of fuzzy logic. The processor implements a fuzzy logic function which receives $S_1(i)$ and $S_2(i)$ as inputs, combines them using fuzzy rules (described below), and produces a single numerical output $w_1(i)$ which represents a degree of accuracy of $d_1(i)$. The numerical output $w_1(i)$ ranges from zero to one, with the estimation accuracy of $d_1(i)$ increasing as $w_1(i)$ approaches one.

Figure 8A:
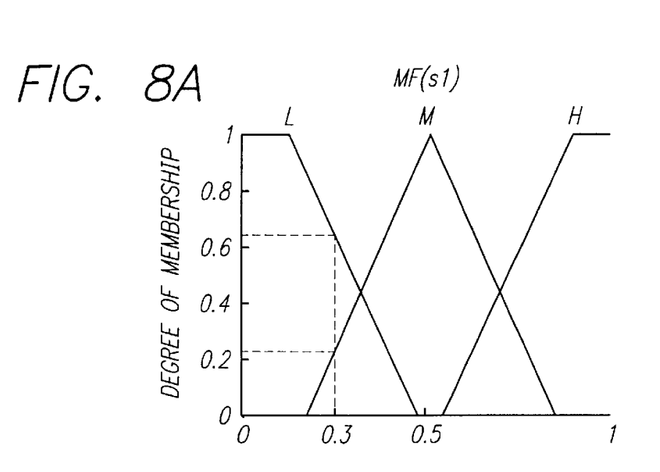
FIGS. 8A–8D are graphs illustrating fuzzy logic membership functions for the quality factor and deviation factor according to the present invention.
Figure 8B:
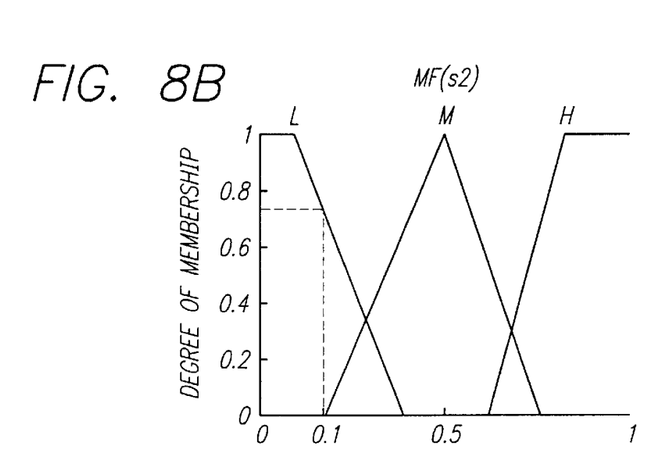
Figure 8C:
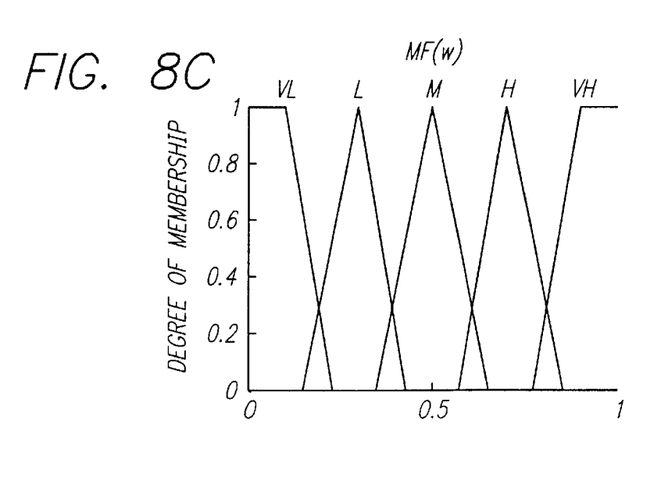

The inputs $S_1(i)$ and $S_2(i)$ are first "fuzzified" into the linguistic expressions, or labels, "high", "medium" and "low". Output $w_1(i)$ also has its fuzzy expression as "very high", "high", "medium", "low" and "very low". Membership functions of $S_1(i)$, $S_2(i)$ and $w_1(i)$ are defined from a large number of experimental results, and are illustrated at FIGS. 8A through 8C, respectively. The membership function of $S_1(i)$ is graphically illustrated at FIG. 8A as having three regions labeled as L (low), M (medium) and H (high). The regions overlap to a certain extent; specifically, the L and M regions overlap, and the M and H regions overlap. The horizontal axis of the membership function graph defines the measured value of $S_1(i)$, and the vertical axis defines the degree of membership of the measured value within the defined label.

The membership function of $S_2(i)$ is graphically illustrated at FIG. 8B, and is constructed similar to the membership function of $S_1(i)$. Similarly, the membership function of $w_1(i)$ is graphically illustrated at FIG. 8C, and is constructed similar to the membership functions of $S_1(i)$ and $S_2(i)$, though it includes five overlapping regions labeled as VL (very low), L (low), M (medium), H (high), and VH (very high). Seven fuzzy rules are used to define the relationship between $S_1(i)$, $S_2(i)$ and $w_1(i)$. These fuzzy rules include:

(1) If $S_1(i)$ is low (L) AND $S_2(i)$ is also low (L), then $w_1(i)$ is medium (M);

(2) If $S_1(i)$ is medium (M) AND $S_2(i)$ is low (L), then $w_1(i)$ is high (H);

(3) If $S_1(i)$ is high (H) AND $S_2(i)$ is low (L), then $w_1(i)$ is very high (VH);

(4) If $S_1(i)$ is low (L) AND $S_2(i)$ is medium (M), the $w_1(i)$ is low (L);

(5) If $S_1(i)$ is medium (M) AND $S_2(i)$ is also medium (M), then $w_1(i)$ is medium (M);

(6) If $S_1(i)$ is high (H) AND $S_2(i)$ is medium (M), then $w_1(i)$ is high (H); and (7) If $S_2(i)$ is high (H), then $w_1(i)$ is very low (VL).

The fuzzy rules are applied in parallel to determine the truth of the rules. For example, assume that measured values of $S_1(i)$ and $S_2(i)$ are 0.3 and 0.1, respectively. In FIG. 8A, a measured value of 0.3 relates to degrees of membership of approximately 0.65 in the L label and approximately 0.25 in the M label. In FIG. 8B, a measured value of 0.1 relates to a degree of membership of approximately 0.75 in the L label only. As a result, only the first two fuzzy rules are true, though they yield inconsistent results in that the first fuzzy rule concludes $w_1(i)$ is medium and the second fuzzy rule concludes that $w_1(i)$ is high. The output $w_1(i)$ must be converted back to a numerical value, and the inconsistent results must be reconciled.

Figure 8D:
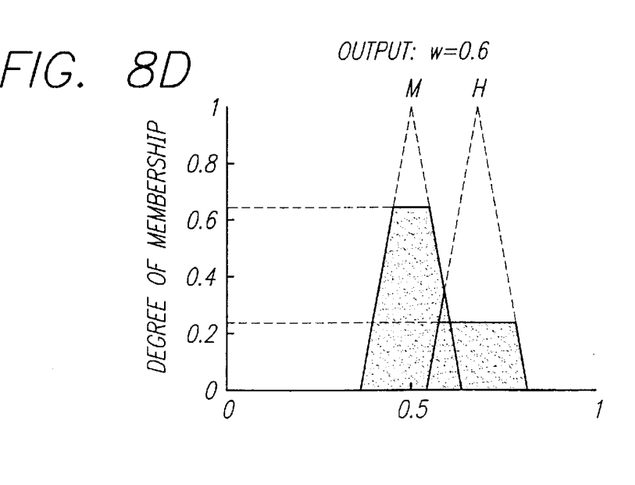

Under the first fuzzy rule, the low value of $S_1(i)$ is combined using a logical AND with the low value of $S_2(i)$ to provide the medium value of $w_1(i)$. Under the logical AND operation, the minimum value of the truth of the expressions is taken as the truth level of the rule. In other words, the 0.65 degree of membership of $S_1(i)$ is less than the 0.75 degree of membership of $S_2(i)$, and is thus taken as the truth level for the first fuzzy rule. Similarly, under the second fuzzy rule, the medium value of $S_1(i)$ is combined using a logical AND with the low value of $S_2(i)$ to provide the high value of $w_1(i)$. The 0.25 degree of membership of $S_1(i)$ is less than the 0.75 degree of membership of $S_2(i)$, and is thus taken as the truth level for the second fuzzy rule. The M and H labels of the $w_1(i)$ membership function are then truncated at the truth levels defined by the fuzzy rules, as illustrated graphically in FIG. 8D.

Finally, a centroid defuzzification technique is used to convert the fuzzy output back to a numerical number $w_1(i)$. Using this technique, an estimate of the center of gravity is provided for the entire region determined to be true (illustrated as the shaded region of FIG. 8D). From FIG. 8D, the center of gravity of the shaded region is approximately 0.6, providing a numerical value for $w_1(i)$. After the reliability parameter $w_1(i)$ is obtained, the next step is to use $w_1(i)$ to improve the local motion estimation $d_1(i)$. If $w_1(i)$ is large, $d_1(i)$ is used directly as a final local motion vector $d_{fin}(i)$. In contrast, if $w_1(i)$ is very small, the frame motion history $d1_h$ is used as the estimated $d_{fin}(i)$, since the motion history is more likely to be a better estimation than the less reliable $d_1(i)$. If $w_1(i)$ is neither very large nor very small, it is used as a weighing factor to average $d_1(i)$ and $d1_h$. For instance, if $w_1(i)=0.6$, as in the above example, then $d_1(i)= 0.6*d_1(i)+(1-0.6)*d1_h$. The motion history $d1_h$ is also updated recursively by weighting $d_1(i)$. The weight is selected to be between zero and one; a larger weight value makes the very recent motion estimation contribute more to the history $d1_h$. For example, if the weight is 0.5, then $d1_h=0.5*1\ d_1(i)+(1-0.5)*d1_h$.

Now, once (or concurrently with) the out of plane motion estimation, an in-plane motion estimation value $d_2$ based on cross-correlation characteristics between two images is determined. According to one embodiment, a minimum sum absolute difference (MSAD) method is used to determine degrees of correlation between speckle images. In addition, in one embodiment, a decorrelation characteristic (based on a FWHM SAD optimization) between the two images is also calculated, and used in conjunction with the $d_1(i)$ determined above, to obtain a more accurate estimate for local out-of-plane motion.

More particularly, as discussed above, the quality factor QF(i) is used to determine which regions are speckle regions. Once the appropriate regions have been identified as speckle regions, the values of the sum-absolute-difference as a function of step number are calculated using:

$$b_{m,k} = \sum_i \sum_j \|r_{i,j} - r_{i+k,j}\|$$

where, m is a small block's index, k is the step number, $l_{i,j}$ is the gray level of the lth B-mode image at a specific point (i,j).

Figure 9:
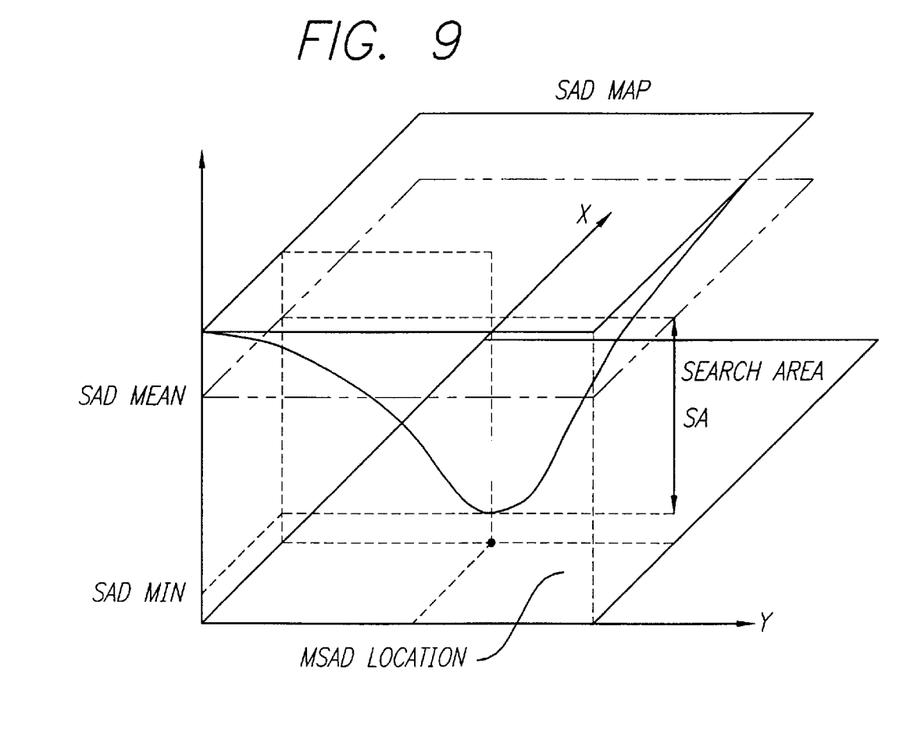
FIG. 9 is a graph illustrating derivation of a quality factor for a minimum sum-absolute-difference search according to an embodiment of the present invention.
Figure 10:
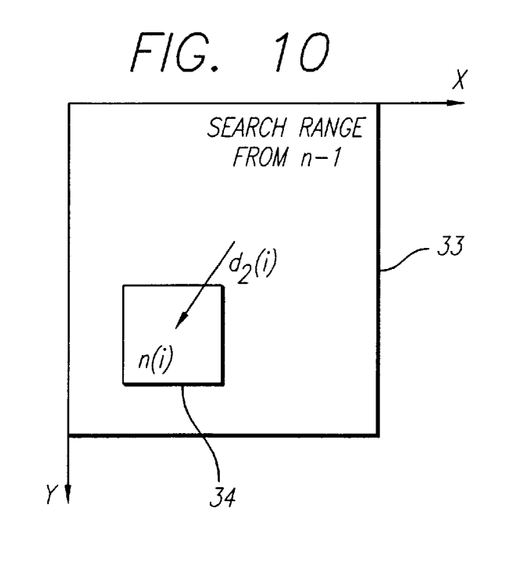
FIG. 10 is a diagram illustrating a minimum-sum-absolute difference search according to an embodiment of the present invention.

Local motion of each block n(i) of a particular image n is estimated by moving the block n(i) around on a comparison image frame n-1 to find the best match. The "best match" is determined by use of a minimum-sum-absolute-difference technique (MSAD) to match the n(i) block with the search region of the comparison frame. The sum-absolute-difference (SAD) is the sum of absolute differences between corresponding pixel values between each block and the search region. The "best match" between the block and the search region occurs where the SAD value is at a minimum. FIG. 9 illustrates a SAD map having values that extend in the X and Y directions. The generally uniform SAD map contains a valley where the SAD values dip below the mean, representing the location of the MSAD. The MSAD technique is used to derive a first estimation of local motion vector $d_2(i)$ having a direction and magnitude indicating how the block n(i) translated from the n-1 image frame to the n image frame. The direction of the local motion vector $d_2(i)$ is denoted by the arrow of FIG. 10.

As in the 3-D case, quality factors $S_a(i)$ and $S_b(i)$ are determined in order to more accurately estimate in-plane motion. Referring to FIG. 5, $S_a(i)$ is a quality factor of MSAD, and measures the difference between the value of MSAD and mean SAD. MSAD quality increases with the value of $S_a(i)$, i.e., the deeper the SAD valley, the better MSAD quality. When strong image noise exists, or when there is a lack of image features, the SAD map will become more flat so that $S_a(i)$ becomes smaller. In that case, the estimation of $d_2(i)$ becomes less reliable.

The second parameter $S_b(i)$ measures how much $d_2(i)$ deviates from its past history. The motion history of the i'th block, $d2_h$, is the recursively weighted averaging of previous final local motion vector outputs of the i'th block. $S_b(i)$ is the vector difference between $d_2(i)$ and $d2_h$. Generally, image motion is fairly smooth and consistent for both experienced and un-experienced ultrasound operators. If one value of $d_2(i)$ has a very different direction and magnitude as compared with its history, it is very likely that this estimation is under the influence of noise or local tissue motion and does not accurately reflect true image local motion. In this case, the $d_2(i)$ estimation may not be very reliable. Thus, a large value of $S_2(i)$ indicates that the estimated $d_2(i)$ is less reliable.

Again, as above, a fuzzy logic technique is employed to implement the above-described quality measure, to produce a single numerical output $w_2(i)$ which represents a degree of accuracy of $d_2(i)$. The numerical output $w_2(i)$ ranges from zero to one, with the estimation accuracy of $d_2(i)$ increasing as $w_2(i)$ approaches one. The fuzzy rules for the in-plane estimation case are similar to those for the out-of-plane case, above, and need not be further elucidated. Additional details of in-plane estimation may be obtained from U.S. Pat. No. 5,575,286, which is hereby incorporated by reference in its entirety.

Figure 11:
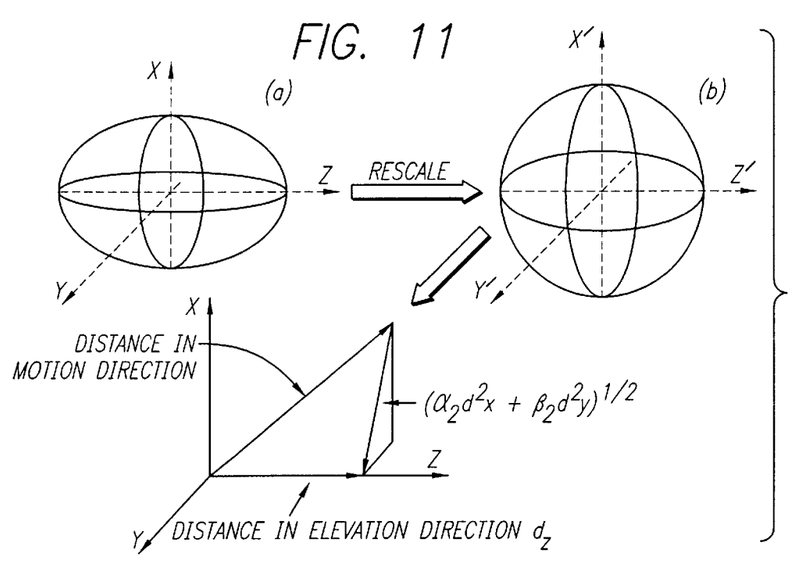
FIG. 11 is a diagram illustrating motion estimation while correcting for anisotropies according to an embodiment of the present invention.

In general cases, the in-plane motion may cause an over-estimation on the elevation (out of plane) motion, since the object's in-plane motion will cause additional decorrelation. The elevation motion (out-of-plane motion) can be more accurately estimated using both a decorrelation characteristic and a cross-correlation characteristic of the speckle information. Accordingly, the FWHM SAD value for the in-plane data are also used to derive a local motion correction estimate $d_z(i)$. More particularly, as shown in FIG. 11, the elevation motion can be estimated by using:

$$d_z \approx \sqrt{d_1^2 - \alpha_2 d_x^2 - \beta_2 d_y^2}$$

where $d_1$ is the motion distance in the motion direction (based on the decorrelation characteristic of speckle in that direction), and $d_x$ and $d_y$ represent the in-plane motion in the x and y directions, respectively (based on the cross-correlation characteristic). The factors $\alpha_2$ and $\beta_2$ are rescale constants considering the anisotropies of 3-D speckle shape, which are determined by using the values of the full width of half maximum of speckle decorrelation rates in the X, Y, and Z directions. Generally, the factors $\alpha_2$ and $\beta_2$ are used for anisotropic to isotropic scaling. In one embodiment, $\alpha_2=[FWHM_z/FWHM_x]^2$ and $\beta_2=[FWHM_z/FWHM_y]^2$.

Figure 12A:
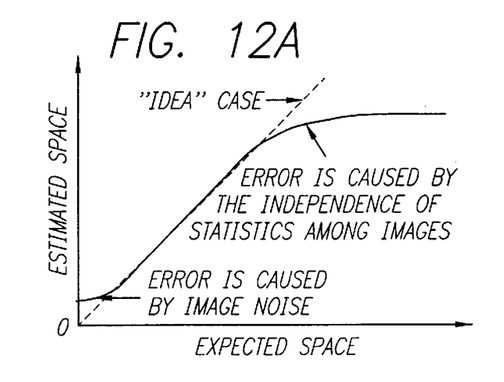
FIG. 12A is a diagram illustrating error due to image noise and independence of statistics among images due to scanning speeds.
Figure 12B:
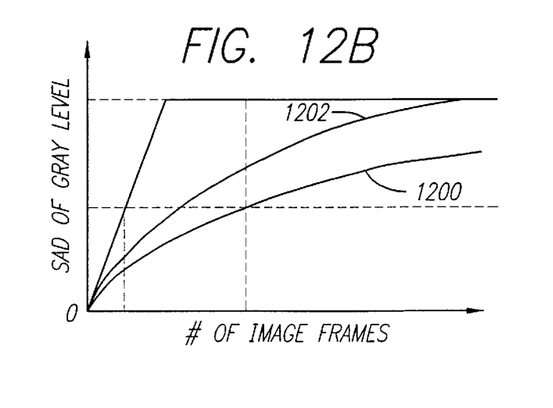
FIG. 12B is a diagram illustrating correction parameters for a speedometer according to an embodiment of the present invention.

It is noted that the accuracy of the out-of-plane motion estimate depends upon the distance between images. As shown in FIG. 12A, if the distances are too small, the image noise will make a relatively large contribution to the SAD value calculation, which will cause estimation bias. However, if the space between images is too large, the statistical properties will be independent. Thus, in one embodiment, a speedometer is provided to give velocity feedback information during clinical scanning. More particularly, as shown in FIG. 12B, a parameter from the decorrelation characteristic (SAD) calculation in the motion direction is used to indicate whether the probe is being moved too quickly. More particularly, for example, so long as the SAD curve and the FWHM are constrained between the curves 1200 and 1202 of FIG. 12A, then the transducer scanning will produce relatively accurate motion estimates. The parameter curves 1200 and 1202 are chosen empirically based on the individual transducer probes. Finally, once all of the local motion vector outputs $d_x(i)$, $d_y(i)$, $d_z(i)$ are estimated for the n'th frame, the outputs may be combined together to estimate the frame global motion vector, gmv(i). According to the present invention, global motion estimation is performed using the local motion vectors $d_x$, $d_y$, $d_z$ in a weighted LMS method. Such a method is described in Horn et al., "Closed-Form Solution of Absolute Orientation Using Orthonormal Matrices", Journal of the Optical Society of America, pp 1127–1135 (1988), which is hereby incorporated by reference in its entirety as if fully set forth herein. A closed form solution to the two dimensional problem is found in Umeyama, IEEE Transactions on Pattern Analysis and Machine Intelligence, Vol 13, No. 4, April 1991, p. 376 et seq.), which is also incorporated by reference in its entirety.

The invention described in the above detailed description is not intended to be limited to the specific form set forth herein, but on the contrary, is intended to cover such alternative, modifications and equivalents as can reasonably be included within the spirit and scope of the appended claims.

What is claimed is:

1. A method for generating a 3-D representation of a region of tissue scanned by a transducer, comprising:
   generating a series of frames, said series of frames representing a volume;
   determining a first decorrelation characteristic of said frames over said volume;
   determining a cross-correlation characteristic over pairs of frames; and
   using said decorrelation characteristic and said cross-correlation characteristic to obtain a motion estimate.

2. A method according to claim 1, further comprising determining a second decorrelation characteristic over said pairs of frames.

3. A method according to claim 2, further comprising using said first and second decorrelation characteristic to determine an out-of-plane motion estimate.

4. A method according to claim 2, wherein said determining a second decorrelation characteristic comprises obtaining a full width half maximum value sum-absolute-difference characteristic.

5. A method according to claim 1, comprising using said cross-correlation characteristic to obtain an in-plane motion estimate.

6. A method according to claim 1, comprising using said decorrelation characteristic to obtain an out-of-plane motion estimate.

7. A method according to claim 1, wherein said determining a first decorrelation characteristic comprises obtaining a full width half maximum value sum-absolute-difference characteristic.

8. A method according to claim 1, wherein said determining a cross-correlation characteristic comprises obtaining a minimum sum-absolute-difference characteristic.

9. A system for generating a 3-D representation of a region of tissue scanned by a transducer, comprising:
   means for generating a series of frames, said series of frames representing a volume;
   means for determining a first decorrelation characteristic of said frames;
   means for determining a cross-correlation characteristic of said frames; and
   means for using said decorrelation characteristic and said cross-correlation characteristic to obtain a motion estimate.

10. A system according to claim 9, further comprising means for determining a second decorrelation characteristic over said frames.

11. A system according to claim 10, further comprising means for using said first and second decorrelation characteristic to determine an out-of-plane motion estimate.

12. A system according to claim 10, wherein said means for determining a second decorrelation characteristic includes means for obtaining a full width half maximum value sum-absolute-difference characteristic.

13. A system according to claim 9, further comprising means for using said cross-correlation characteristic to obtain an in-plane motion estimate.

14. A system according to claim 9, further comprising means for using said decorrelation characteristic to obtain an out-of-plane motion estimate.

15. A system according to claim 9, wherein said means for determining a first decorrelation characteristic includes means for obtaining a full width half maximum value sum-absolute-difference characteristic.

16. A system according to claim 9, wherein said means for determining a cross-correlation characteristic includes means for obtaining a minimum sum-absolute-difference characteristic.

17. A method for generating a 3-D representation of a region of tissue scanned by a transducer, comprising:

generating a series of frames;

determining a first characteristic of said frames related to out-of-plane motion;

determining a second characteristic of said frames relating to in-plane motion; and using said first and second characteristics to obtain a motion estimate wherein said first characteristic is a first decorrelation characteristic.

18. A method according to claim 17, further comprising determining a third characteristic of said frames relating to out-of-plane motion.

19. A method according to claim 18, further comprising using said third characteristic and said first characteristic to obtain an out-of-plane motion estimate.

20. A method according to claim 18, wherein said third characteristic is a second decorrelation characteristic.

21. A method according to claim 20, wherein said third characteristic is obtained using a full width half maximum value sum-absolute-difference technique.

22. A method according to claim 17, wherein said second characteristic is a cross-correlation characteristic.

23. A method according to claim 22, wherein said cross-correlation characteristic is obtained using a minimum sum-absolute-difference technique.

24. A method according to claim 17, wherein said first characteristic is obtained using a full width half maximum value sum-absolute-difference technique.

* * * * *